(12) United States Patent
Ikuta

(10) Patent No.: US 10,788,777 B2
(45) Date of Patent: Sep. 29, 2020

(54) IMAGE INSPECTION SYSTEM, IMAGE INSPECTION METHOD, NON-TRANSITORY COMPUTER-READABLE RECORDING MEDIUM STORING IMAGE INSPECTION PROGRAM

(71) Applicant: Konica Minolta, Inc., Tokyo (JP)

(72) Inventor: Masaya Ikuta, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/554,898

(22) Filed: Aug. 29, 2019

(65) Prior Publication Data

US 2020/0096925 A1    Mar. 26, 2020

(30) Foreign Application Priority Data

Sep. 25, 2018    (JP) .................. 2018-179083

(51) Int. Cl.
    *G03G 15/00*    (2006.01)
    *H04N 1/00*     (2006.01)
    *G06F 3/12*     (2006.01)

(52) U.S. Cl.
    CPC ....... *G03G 15/5041* (2013.01); *G06F 3/1234* (2013.01); *H04N 1/00042* (2013.01); *H04N 1/00702* (2013.01); *H04N 1/00748* (2013.01)

(58) Field of Classification Search
    CPC .............. G03G 15/5041; G06F 3/1234; H04N 1/00042; H04N 1/00702; H04N 1/00748
    See application file for complete search history.

(56) References Cited

U.S. PATENT DOCUMENTS 6,563,524 B1 * 5/2003 Regimbal .......... H04N 1/00002
                                                  347/116

FOREIGN PATENT DOCUMENTS

JP    2008-219296 A    9/2008

* cited by examiner

*Primary Examiner* — Hoang X Ngo
(74) *Attorney, Agent, or Firm* — Lucas & Mercanti, LLP

(57) ABSTRACT

An image inspection system including: an image forming apparatus that forms an image on a sheet; an image reading apparatus that reads the image formed on the sheet through the image forming apparatus; and an image inspector that inspects the image read by the image reading apparatus. The image inspector includes a hardware processor that sets an edge portion of the sheet as an image inspection excluded area that is excluded from targets for inspection of the image.

23 Claims, 13 Drawing Sheets

FIG. 6

| | MAKE SETTINGS AND CONFIRM | | | | | |
|---|---|---|---|---|---|---|
| | JOB TICKET | | FILE NAME: 180227_160612_ | | EDIT JOB TICKET | EDIT IMAGE PAGE |
| | | TICKET PER PAGE | SHEET NO. 1/ 1 | | | CHECK ERRORS |

| ID | REFERENCE IMAGE NAME | REGISTRATION DATE AND TIME | SHEET SIZE | NUMBER OF PAGES |
|---|---|---|---|---|
| 00001 | REFERENCE IMAGE JOB A | 2018/12/23 10:00 | A3 | 2,600 |
| 00002 | REFERENCE IMAGE JOB B | 2018/12/24 10:00 | SRA3 | 101 |
| 00003 | REFERENCE IMAGE JOB C | 2018/12/25 10:00 | A4 | 600 |
| 00004 | REFERENCE IMAGE JOB D | 2018/12/26 10:00 | B4 | 1201 |
| 00005 | REFERENCE IMAGE JOB E | 2018/12/27 10:00 | 220.0 × 1200.0mm | 20 |
| 00006 | REFERENCE IMAGE JOB F | 2018/12/28 10:00 | SRA3 | 1 |
| 00007 | REFERENCE IMAGE JOB G | 2018/12/29 10:00 | POSTCARD | 2500 |
| 00008 | REFERENCE IMAGE JOB H | 2018/12/30 10:00 | 11 × 17 | 1 |
| 00009 | REFERENCE IMAGE JOB I | 2018/12/31 10:00 | B6 | 1 |
| 00010 | REFERENCE IMAGE JOB J | 2018/01/01 10:00 | SRA4 | 15 |

PROFILE NO.

◀ 1/ 1 ▶

220

CANCEL     OK

OUTPUT SAMPLE     CANCEL     SAVE     SAVE AS

FIG. 7

YOU CAN PRINT NOW

| MAIN BODY | ORIGINAL DOCUMENT COUNTER | 0 | REMAINING MEMORY | 100.000% |
|---|---|---|---|---|
| | RESERVE/NUMBER OF JOBS | 0 | REMAINING FINE SYSTEM | 100.000% |

SCANNER IS AVAILABLE

SAMPLE EJECTION OUTPUT

JOB

| No. | MODE | STATUS | TIME (MIN) | USER NAME |
|---|---|---|---|---|
| | | | | |

SHEET TRAY

| TRAY | SIZE (mm) | NAME | BASIS WEIGHT | |
|---|---|---|---|---|
| 1 | 8.5 × 11 | PLAIN PAPER | 52–61 g/m² | — |
| 2 | 8.5 × 11 | PLAIN PAPER | 52–61 g/m² | ▶ ■ |
| 3 | 12 × 18 | PLAIN PAPER | 52–61 g/m² | |
| 4 | 11 × 17 | PLAIN PAPER | 52–61 g/m² | ▶ ■ |
| 5 | A3 | PLAIN PAPER | 52–61 g/m² | ■ ■ |
| 6 | 13 × 19 | PLAIN PAPER | 52–61 g/m² | |
| 7 | 8.5 × 11 | PLAIN PAPER | 52–61 g/m² | |
| 8 | A3 | PLAIN PAPER | 52–61 g/m² | |
| 9 | 11 × 17 | PLAIN PAPER | 52–61 g/m² | |

UNITS TO ADD/DISPOSE OF

- ○ TONER Y  ○ TONER M  ○ TONER C  ○ TONER K
- ○ DISPOSAL TONER BOX  ○ STAPLES
- ○ PUNCH WASTE BOX  ○ STAPLE WASTE BOX
- ○ CYCLONE BOX
- ○ HUMIDIFICATION TANK

| MANUALLY ADJUST OUTPUT SHEET PRINT DENSITY | OUTPUT SHEET PRINT DENSITY ADJUSTMENT RESULTS | REGISTER/DELETE SHEET CONDITION | AMBIENT TEMPERATURE : 0°C | IQ DETECTION RESULTS | AMBIENT HUMIDITY : 0% | MANAGE REFERENCE IMAGE ~ 230 |

FIG. 8

| | | CLICK "CLOSE" TO CONFIRM SETTING AND END | | | | |
|---|---|---|---|---|---|---|
| | | SET NUMBER OF COPIES 0001 | | ORIGINAL DOCUMENT COUNTER 0 | REMAINING MEMORY 100.000% | |
| | | | | RESERVED/NUMBER OF JOBS 0 | REMAINING FINE SYSTEM 100.000% | |

MANAGE REFERENCE IMAGE

| ID | REFERENCE IMAGE NAME | DISPLAY ALL | REGISTERED DATE AND TIME | SHEET SIZE | NUMBER OF PAGES |
|---|---|---|---|---|---|
| 00001 | REFERENCE IMAGE JOB A | | 2018/12/23 10:00 | A3 | 2,600 |
| 00002 | REFERENCE IMAGE JOB B | | 2018/12/24 10:00 | SRA3 | 101 |
| 00003 | REFERENCE IMAGE JOB C | | 2018/12/25 10:00 | A4 | 600 |
| 00004 | REFERENCE IMAGE JOB D | | 2018/12/26 10:00 | B4 | 1201 |
| 00005 | REFERENCE IMAGE JOB E | | 2018/12/27 10:00 | 220.0 × 1200.0mm | 20 |
| 00006 | REFERENCE IMAGE JOB F | | 2018/12/28 10:00 | SRA3 | 1 |
| 00007 | REFERENCE IMAGE JOB G | | 2018/12/29 10:00 | POSTCARD | 2500 |
| 00008 | REFERENCE IMAGE JOB H | | 2018/12/30 10:00 | 11 × 17 | 1 |
| 00009 | REFERENCE IMAGE JOB I | | 2018/12/31 10:00 | B6 | 1 |
| 00010 | REFERENCE IMAGE JOB J | | 2018/01/01 10:00 | SRA4 | 15 |

▲ 000001/100000 ▼    [DESIGNATE AREA]—240    [MULTIPLE SELECTIONS] [SELECT ALL]    [DELETE]    [CLOSE]

| FRONT SIDE | BACK SIDE | DESIGNATED PAGE (1page) | EDGE PORTION |
|---|---|---|---|
| 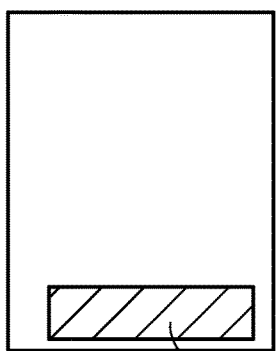 | 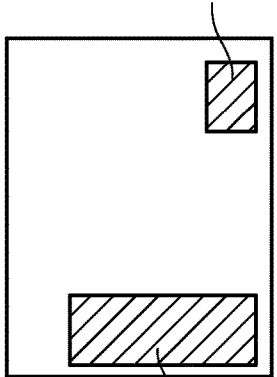 | 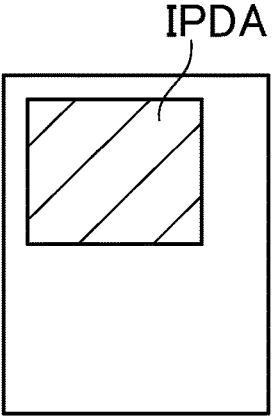 | 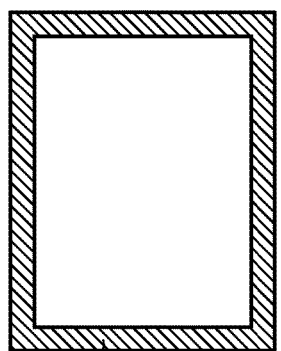 |
| FDA | BDA-1, BDA-2 | IPDA | EDA |
| FIG. 11A | FIG. 11B | FIG. 11C | FIG. 11D |
| FIRST SHEET | | SECOND SHEET | |
|---|---|---|---|
| FIRST PAGE | SECOND PAGE | THIRD PAGE | FOURTH PAGE |
| 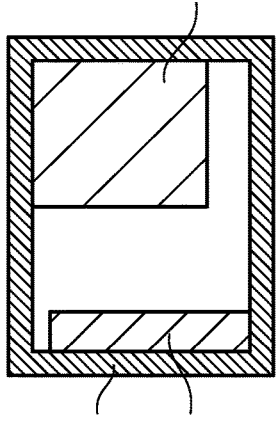 | 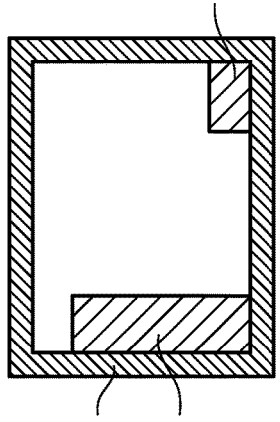 | 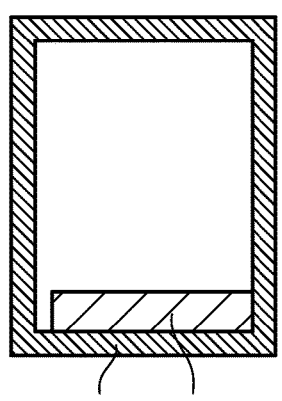 | 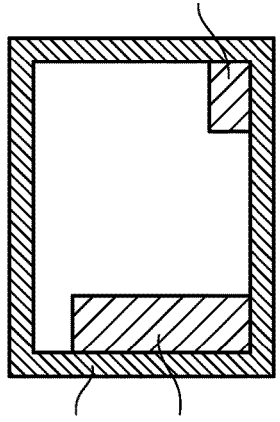 |
| IPDA, EDA, FDA | BDA-1, EDA, BDA-2 | EDA, FDA | BDA-1, EDA, BDA-2 |
| FIG. 12A | | FIG. 12B | |

FIG. 14

| DISTANCE FROM SHEET EDGE PORTION | | IMAGE FORMING APPARATUS A | | IMAGE FORMING APPARATUS B | |
|---|---|---|---|---|---|
| | | SHEET TYPE X | SHEET TYPE Y | SHEET TYPE X | SHEET TYPE Y |
| | FRONT EDGE | 3mm | 5mm | 4mm | 5mm |
| | REAR EDGE | 3mm | 5mm | 6mm | 6mm |
| | BOTH SIDES | 6mm | 6mm | 4mm | 5mm |

IMAGE INSPECTION SYSTEM, IMAGE
INSPECTION METHOD, NON-TRANSITORY
COMPUTER-READABLE RECORDING
MEDIUM STORING IMAGE INSPECTION
PROGRAM

CROSS REFERENCE TO RELATED
APPLICATIONS

The entire disclosure of Japanese Patent Application No. 2018-179083 filed on Sep. 25, 2018 is incorporated herein by reference in its entirety.

BACKGROUND

Technological Field

The present invention relates to an image inspection system, an image inspection method, and a non-transitory computer-readable recording medium storing an image inspection program.

Description of Related Art

With an image forming apparatus (copier, printer, facsimile machine, copier-based or multifunctional peripherals for them) that forms toner images on sheets, formation of an expected image on a sheet may be failed due to an unexpected cause or the like. For this reason, an image inspection system is known which has an image reading apparatus disposed downstream from the image forming apparatus and compares an image read through the image reading apparatus with a reference normal image to judge a failure/no-failure of the image printed on the sheet.

Meanwhile, the problem arises that accurate judgement of a failure/no-failure in the image may be failed even with such an image inspection system. For example, for the technique disclosed in Japanese Patent Application Laid-Open No. 2008-219296 (hereinafter referred to as PTL 1), the problem arises that images including fine images such as dots cannot be accurately inspected, and exclusion of such fine images from inspection targets has been proposed.

By the way, with the image forming apparatus, depending on the type of sheet to be used, various types of deformation (hereinafter simply referred to as "misdirection"), such as bend, occurs in edge portions of the sheet, and this misdirection may cause false detection accompanied with, for example, the message "image defect has occurred" in the aforementioned image inspection system. Since formation of an image in sheet edge portions using the image forming apparatus is unstable, even if an image is printed near a sheet edge portion, false detection accompanied with, for example, the message "image defect has occurred" may occur in the image inspection system.

SUMMARY

An object of the present invention is to provide an image inspection system, an image inspection method, and a non-transitory computer-readable recording medium storing an image inspection program that can suppress occurrence of false detection in image inspection due to misdirection in sheet edge portions.

To achieve at least one of the abovementioned objects, according to an aspect of the present invention, an image inspection system reflecting one aspect of the present invention comprises:

an image former that forms an image on a sheet;
an image reader that reads the image formed on the sheet through the image former; and
an image inspection apparatus that inspects the image read by the image reading apparatus, wherein
the image inspector includes a hardware processor that sets an edge portion of the sheet as an image inspection excluded area that is excluded from targets for inspection of the image.

To achieve at least one of the abovementioned objects, according to an aspect of the present invention, an image inspection method reflecting one aspect of the present invention comprises:

forming an image on a sheet;
reading the image on the sheet; and
setting an edge portion of the sheet as an image inspection excluded area that is excluded from targets for inspection of the image, and inspecting the read image.

To achieve at least one of the abovementioned objects, according to an aspect of the present invention, a non-transitory computer-readable recording medium stores an image inspection program reflecting one aspect of the present invention, the program causing a computer to perform:

forming an image on a sheet;
reading the image on the sheet; and
setting an edge portion of the sheet as an image inspection excluded area and inspecting the read image.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 6 is a diagram showing an example screen for selecting a reference image;

FIG. 7 is a diagram showing an example top screen before transition to a reference image management screen;

FIG. 8 is a diagram showing an example of a reference image management screen;

FIGS. 11A to 11D are diagrams showing a setting example related to the case where multiple image inspection excluded areas are set through an excluded area setting screen before execution of image inspection for inspecting images printed on both sides of multiple sheets;

FIGS. 12A and 12B are diagrams showing portions to be treated as image inspection excluded areas during image inspection related to the setting example shown in FIGS. 11A to 11D;

FIG. 14 is a table for explaining a specific example of the case where image inspection excluded areas in the sheet edge portion are determined from the model of the image forming apparatus and the type of sheet to be used.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
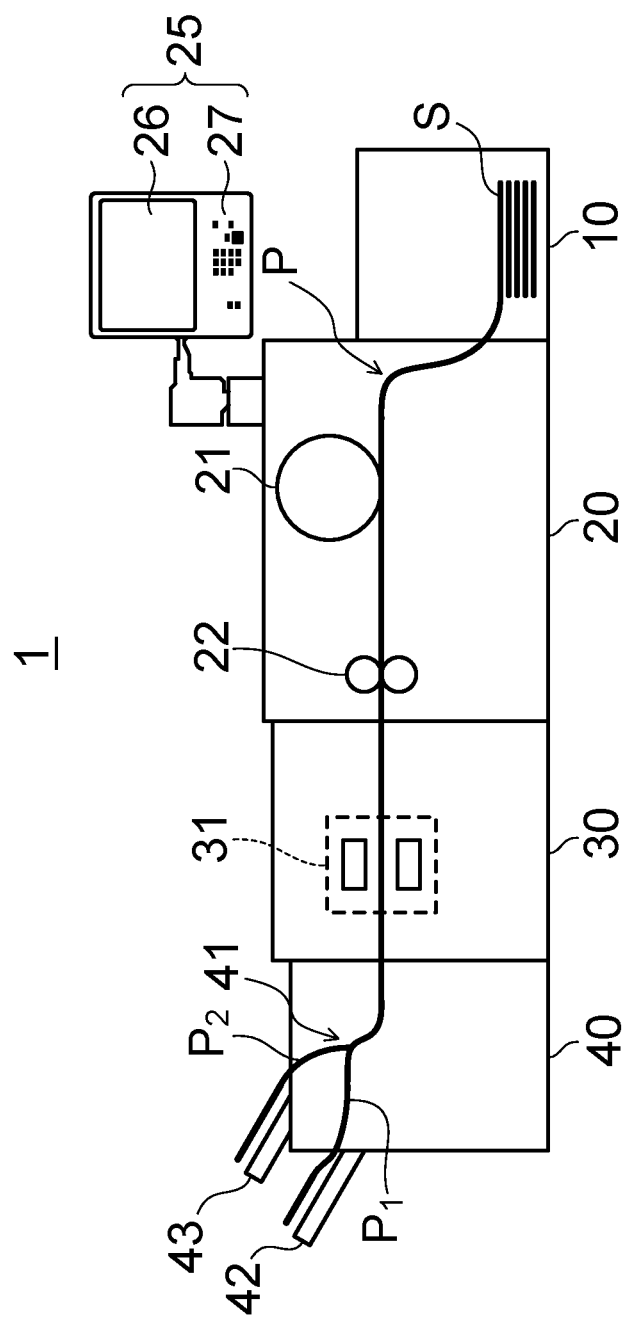
FIG. 1 is a diagram schematically showing the entire configuration of an image quality inspection system according to this embodiment.
Figure 2:
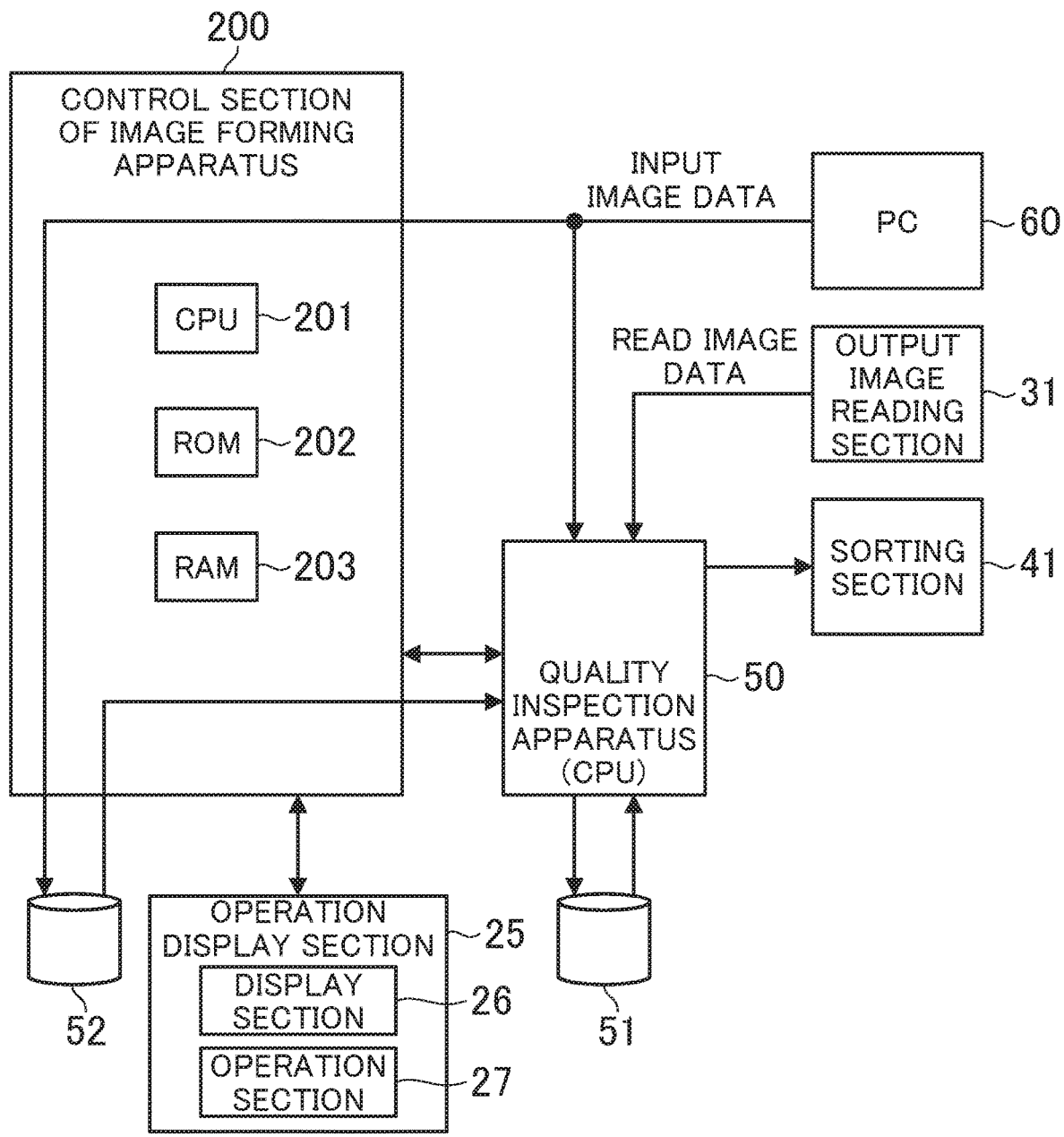
FIG. 2 is a block diagram showing the main part of a control system in the image quality inspection system according to this embodiment.

Image quality inspection system 1 shown in FIGS. 1 and 2 forms (outputs) an image on sheet S through image forming apparatus 20, reads the image on that sheet S, inspects failure/no-failure (presence or absence of an image failure) in the quality of the output image according to the reading results, and then displays the inspection results, for example.

As shown in FIG. 1, image quality inspection system 1 includes image forming apparatus 20 that forms an image based on input image data on sheet S, sheet feeding apparatus 10 that feeds sheet S to image forming apparatus 20, image reading apparatus 30 that reads the image on sheet S supplied from image forming apparatus 20, and postprocessing apparatus 40 including multiple sheet trays (42, 43).

In image quality inspection system 1, sheet feeding apparatus 10, image forming apparatus 20, image reading apparatus 30, and postprocessing apparatus 40 are physically connected in the order presented from the upstream side of the sheet S conveying direction (apparatus bodies are coupled to one another), and conveyance path P for sheet S lies between these apparatus. This conveyance path P is branched by sorting section 41 of postprocessing apparatus 40 to path $P_1$ connected to lower sheet tray 42 and path $P_2$ connected to upper sheet tray 43.

Although conveyance path P in image forming apparatus 20 is indicated by a single line for simplicity in FIG. 1, a double-sided transfer path for double-sided printing is provided in actual image forming apparatus 20. In addition, although there are two branch paths $P_1$ and $P_2$ in postprocessing apparatus 40 for simplicity in FIG. 1, more branch paths may be provided depending on the number of sheet trays.

Sheet feeding apparatus 10 can contain various sizes or types of sheets S. Sheet feeding apparatus 10 includes a sheet feeding roller for feeding contained (stacked) sheets S one by one, a motor for driving the sheet feeding roller, and the like.

Image forming apparatus 20 includes intermediate transfer type image formation section 21 using electrophotographic process technology. In this example, image formation section 21 primary-transfers toner images of yellow (Y), magenta (M), cyan (C), and black (K) formed on a photoconductor drum, which is not shown in the drawings, on an intermediate transfer belt (not shown in the drawings), superimposes the toner images of the four colors together on the intermediate transfer belt, and secondary-transfers it to sheet S, thereby forming a toner image. On the downstream side of the sheet S conveying direction in image formation section 21, fixing section 22 is disposed for fixing the toner image on sheet S by heating and pressing the conveyed sheet S with the secondary-transferred toner image. These image formation section 21 and fixing section 22 have well-known configurations and their detailed description will therefore be omitted. The scheme for formation of images in image forming apparatus 20 is not necessarily the above-described scheme and may be any of other various schemes.

Operation display section 25 is provided to the apparatus body of image forming apparatus 20. This operation display section 25 consists of, for example, a liquid crystal display (LCD) with a touch screen, and functions as display section 26 and operation section 27. Display section 26 displays various operating screens, the image state, the operation status of each function, and the like in response to a display control signal input from control section 200, which will be described later. Operation section 27, which includes various operation keys (so-called hardware switches), such as a numeric key pad and a start key, receives various input operations from the user and outputs an operation signal to control section 200. Display section 26 displays various icons (so-called software switches) selectable with a cursor (pointer) or the like on various screens described below, and outputs an operation signal to control section 200 upon reception of various input operations from the user.

As shown in FIG. 2, image forming apparatus 20 includes control section 200 that entirely controls image forming apparatus 20. Control section 200 includes central processing unit (CPU) 201, read only memory (ROM) 202, random access memory (RAM) 203, and the like, and controls the operations of the above-described image formation section 21, fixing section 22, operation display section 25, and sections included in image forming apparatus 20. In particular, CPU 201 of control section 200 reads a program suitable for the content of processing from ROM 202 and expands it to RAM 203, and performs central control on the operations of image formation section 21, fixing section 22, operation display section 25, and the other blocks in image forming apparatus 20 in cooperation with the expanded program.

Examples of the other blocks included in image forming apparatus 20 include an image processing section that performs various types of correction, such as tone correction, on the input image data, a sheet conveying section that drives multiple conveyance rollers that convey sheets S, and a communication section that communicates with external apparatuses, such as a server, via a communication network. Further, image forming apparatus 20 may have the configuration of a copier that copies document images on sheets S, specifically, may include an automated document sheet feeding apparatus, such as an auto document feeder (ADF), and a document image scanning apparatus (scanner). The above-described blocks have well-known configurations and their illustration in the drawings or description will therefore be omitted.

As shown in FIGS. 1 and 2, image reading apparatus 30 includes output image reading section 31 that optically reads the image (toner image) on sheet S discharged from image forming apparatus 20. To be specific, output image reading section 31 optically scans sheet S (scanning), causes the reflected light from sheet S to form an image on the light receiving surface of a charge coupled device (CCD) sensor (not shown in the drawings), reads the images on both sides of sheet S, and generates read image data based on the reading results. Read image data generated by output image reading section 31 is input to quality inspection apparatus 50 serving as the image inspection apparatus described later.

As shown in FIGS. 1 and 2, postprocessing apparatus 40 includes a conveyance roller that conveys sheet S the image of which has been read by image reading apparatus 30, multiple sheet trays 42 and 43 that discharge that sheet S, and sorting section 41 that switches the discharge destination (conveying route) of sheet S. Although FIG. 1 illustrates a configuration provided with two sheet trays 42 and 43 for simplicity, the number of sheet trays is arbitrary, and more sheet trays may be provided. Sorting section 41 includes a switching gate that switches the discharge destination (conveying route) of sheet S to either path $P_1$ or path $P_2$, a drive source, such as a solenoid, that drives the switching gate, and an interface for transmitting and receiving data to/from image forming apparatus 20 and quality inspection apparatus 50.

In addition, postprocessing apparatus 40 can have various additional functions according to the application, such as a cutter for cutting sheets S, a stapler for stapling sheets S, and a sheet folding mechanism for folding sheets S. These additional functions have well-known configurations and their illustration in the drawings or description will therefore be omitted.

As shown in FIG. 2, image quality inspection system 1 includes quality inspection apparatus 50 that inspects a failure/no-failure (presence or absence of an image failure) in the quality of the output image formed (output) on that sheet S, according to the read image data generated by image reading apparatus 30. This quality inspection apparatus 50 includes a hardware processor, such as a CPU, a ROM, and data storage section 51, which will be described later, and a job (hereinafter referred to as a quality check job) for inspecting a failure/no-failure (presence or absence of an image failure) in the quality of the output image is executed when the CPU reads and executes a program stored in the ROM.

In this embodiment, quality inspection apparatus 50 functions as a reference image generating section that generates reference images used for image inspection, based on a first read image generated by image reading apparatus 30. Further, quality inspection apparatus 50 functions as an image inspection section that inspects the presence or absence of an image failure by comparison between a second read image generated by image reading apparatus 30 and the reference image. It should be noted that the details of these functions of quality inspection apparatus 50 will be described later.

Quality inspection apparatus 50 can be physically incorporated in, for example, a casing such as image reading apparatus 30, postprocessing apparatus 40, or even image forming apparatus 20, or may be an apparatus physically independent of these apparatuses. In the example shown in FIG. 2, quality inspection apparatus 50 is the latter, that is, a physically independent apparatus, and is electrically connected to control section 200, which will be described later, or the like of image forming apparatus 20. This quality inspection apparatus 50 corresponds to an "image inspection apparatus" of the present invention.

Further, as shown in FIG. 2, image quality inspection system 1 includes PC 60 that outputs input image data and data of printing conditions (various user-set values such as the printing method and the number of copies). In the example shown in FIG. 2, PC 60 supplies these data to both image forming apparatus 20 (control section 200) and quality inspection apparatus 50. Alternatively, a relay apparatus may be provided to branch the reference data transmitted from PC 60 into two and transmits them to control section 200 and quality inspection apparatus 50.

In addition, as shown in FIG. 2, image quality inspection system 1 includes data storage sections 51 and 52 for storing various data such as the reference data described above. Among these, data storage section 51 is a part of quality inspection apparatus 50, and is used to temporarily store reference data. In addition, data storage section 51 stores various data related to an image failure detected by quality inspection apparatus 50. Meanwhile, data storage section 52 is provided in the main body (casing) of image forming apparatus 20, and is connected to control section 200 and the CPU of quality inspection apparatus 50 via an interface which is not shown in the drawings. These data storage sections 51 and 52 can be composed of various data storage media such as HDDs and semiconductor memories.

Figure 3:
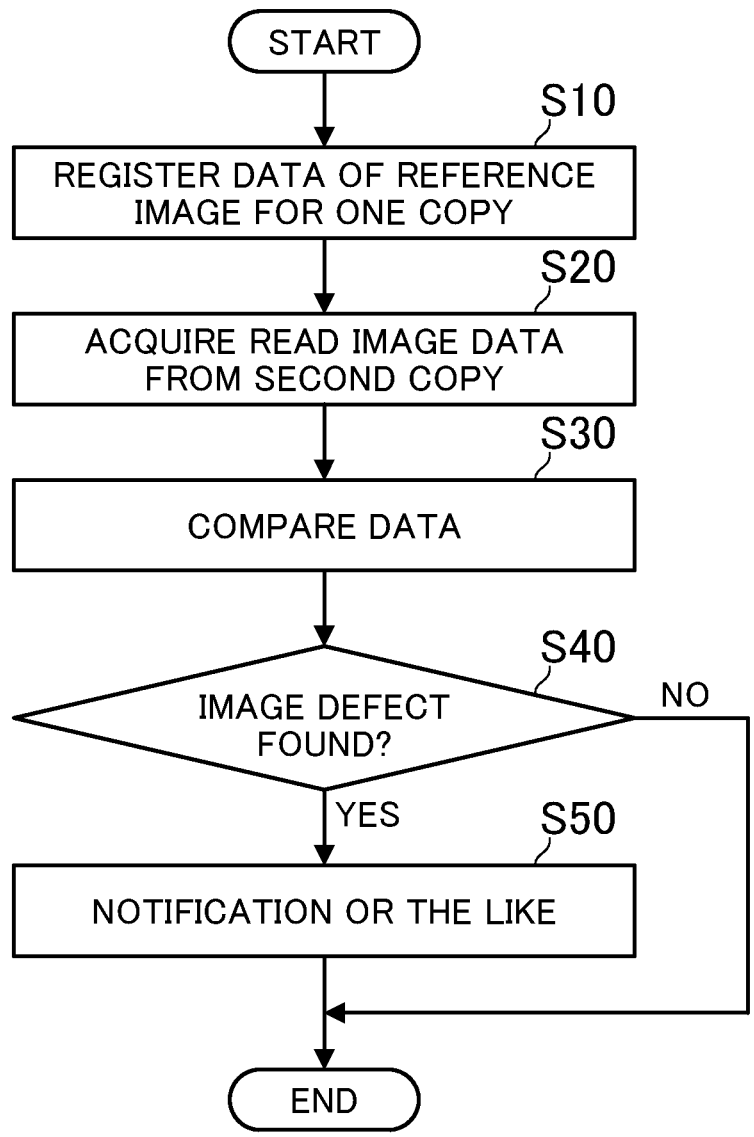
FIG. 3 is a flowchart for describing the outlines of the flow of processing of a quality check job.

The outlines of processing of the quality check job executed by quality inspection apparatus 50 will now be explained with reference to the flowchart of FIG. 3. In this example, it is assumed that, in the case where multiple copies of a printed material in which multiple pages (for example, three sheets) correspond to one copy is printed and a failure/no-failure in the image on the print material of multiple copies is inspected, the data of the reference image on this printed material (for three sheets) is newly created.

In Step S10, quality inspection apparatus 50 (the CPU of quality inspection apparatus 50 shown in FIG. 2; the same applies hereinafter) registers (newly creates), as data of a reference image, one copy of read image data that has been printed by image forming apparatus 20 and read by image reading apparatus 30 when a print job is executed.

To be specific, quality inspection apparatus 50 temporarily saves an image (read image data) in one copy (three sheets of paper in this example) generated by image reading apparatus 30 to a RAM or the like as a candidate for a reference image. The image on the actual printed material (for three sheets) is checked by the user, and if there is no problem, the temporarily saved data is stored (registered) in data storage section 51 as the data of a formal reference image through operational input on the reference image registration screen (not shown in the drawings) displayed on display section 26. Afterwards, continuous execution of the print job from the second copy is started by image forming apparatus 20.

For simplicity, in the description below, printing for creating new data of a reference image is referred to as "proof printing", and printing intended for a quality check job is referred to as "main printing".

In Step S20, quality inspection apparatus 50 acquires read image data that corresponds to the second and later copies (the fourth and later sheets in this example) and has been mainly printed by image forming apparatus 20 and generated by output image reading section 31 of image reading apparatus 30. In one specific example, quality inspection apparatus 50 receives the generated read image data directly from image reading apparatus 30.

In Step S30, quality inspection apparatus 50 inspects the coidentity between the reference image and the read image by comparing the read image data acquired in Step S20 with the data of the corresponding reference image registered in Step S10.

In Step S40, quality inspection apparatus 50 determines whether there is an image failure in the read image data. The processing for this determination differs depending on the item related to the degree of coincidence of the reference image and the read image (type of image failure), the acceptable/non-acceptable reference value (threshold), and the like. These are similar to those in known methods and the detailed explanation of the determination method will therefore be omitted.

Here, when quality inspection apparatus 50 determines that the read image data does not have an image failure (NO in Step S40), the image quality of the printed material is regarded as being acceptable. In this case, quality inspection apparatus 50 notifies postprocessing apparatus 40 to discharge sheet S corresponding to this read image data to the preset first tray (for example, sheet tray 42 in FIG. 1). Subsequently, quality inspection apparatus 50 repeats the processing of Steps S20 to S40 until the print job related to the quality check is completed, and ends the processing upon completion of the print job. In this case, quality inspection apparatus 50 notifies control section 200 of image forming apparatus 20 that, for example, "image quality has been accepted on all the print pages."

In contrast, when quality inspection apparatus 50 determines that there is an image failure in the read image data (YES in Step S40), the process proceeds to Step S50.

In Step S50, quality inspection apparatus 50 transmits, for example, the message that "an image failure has occurred in the 100th print page" to control section 200 of image forming apparatus 20. At this time, quality inspection apparatus 50 transmits the type of the abnormality, the position of the abnormality in sheet S, and the like together to control section 200 of image forming apparatus 20. In addition, quality inspection apparatus 50 instructs postprocessing apparatus 40 to discharge sheet S corresponding to the read image data having the image failure to the second tray (for example, sheet tray 43 in FIG. 1).

Postprocessing apparatus 40 notified of the presence or absence of an image failure from quality inspection apparatus 50 operates the switching gate of sorting section 41 so that sheet S of interest is discharged to the corresponding sheet tray (42 or 43).

Quality inspection apparatus 50 repeatedly performs the above-described processing of Step S20 to Step S50 until the quality check job is accomplished, transmits the quality check results to image forming apparatus 20 upon completion (accomplishment) of the quality check job, and ends the quality check job.

Note that the data of the reference image newly created in the aforementioned procedure and stored (registered) in data storage section 51 can be saved as needed so that it can be reused for the following quality check job, or can be appropriately deleted from data storage section 51 by an operation of a user to save memory resources and the like. Moreover, the data of the reference image stored (registered) in data storage section 51 is used for other image inspection systems on the network and may therefore be transmitted to a server on the network and held in the server.

Figure 4:
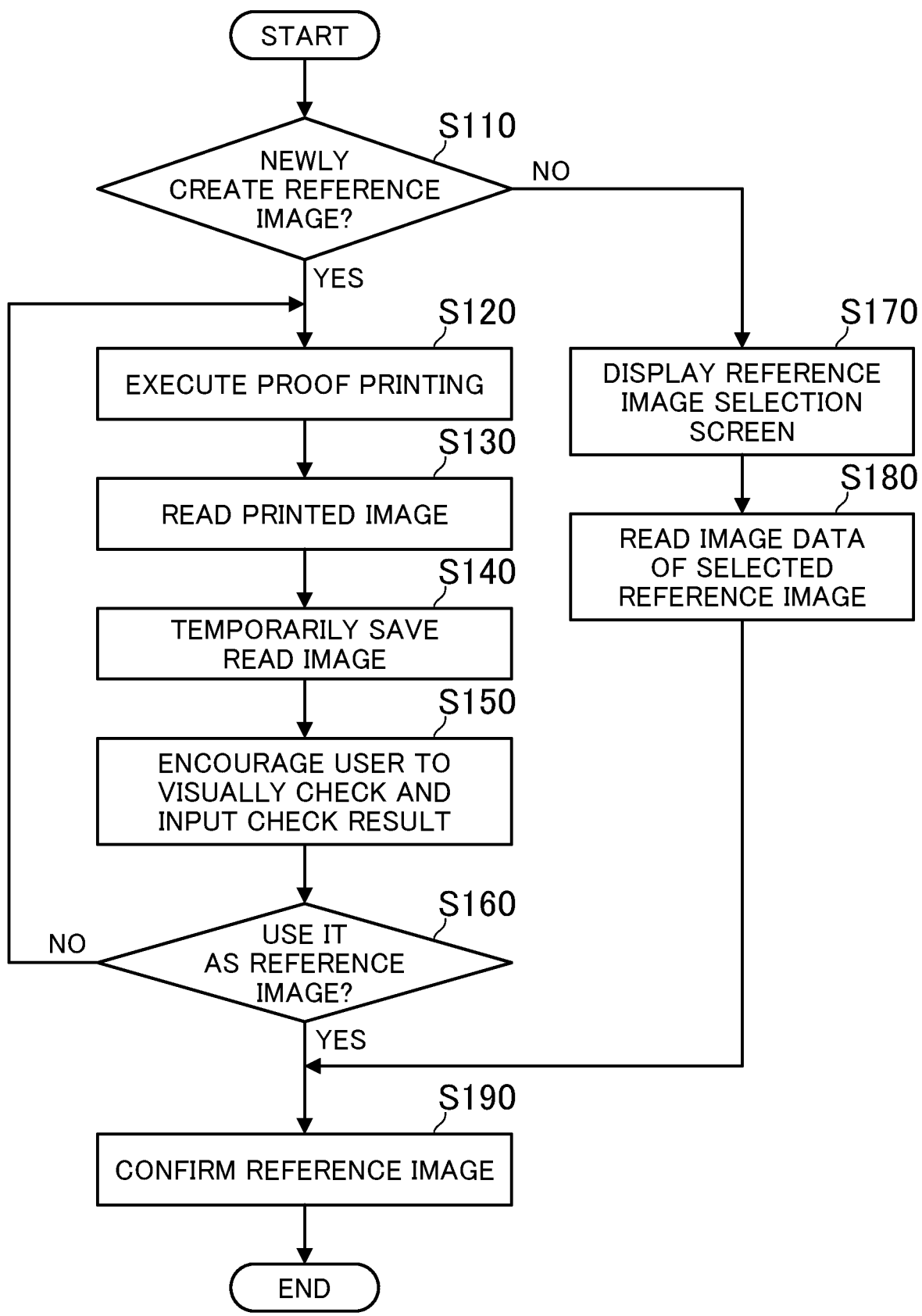
FIG. 4 is a flowchart showing the flow of processing to confirmation of a reference image.

The processing for determining the reference image to be used in a quality check job will now be described in more detail. FIG. 4 is a flowchart showing the flow of processing to confirmation of a reference image.

In Step S110, quality inspection apparatus 50 transmits an instruction to control section 200 of the image forming apparatus to cause display section 26 to display a screen on which the user selects the setting method of the reference image, and determines whether or not a reference image is to be newly created.

Figure 5:
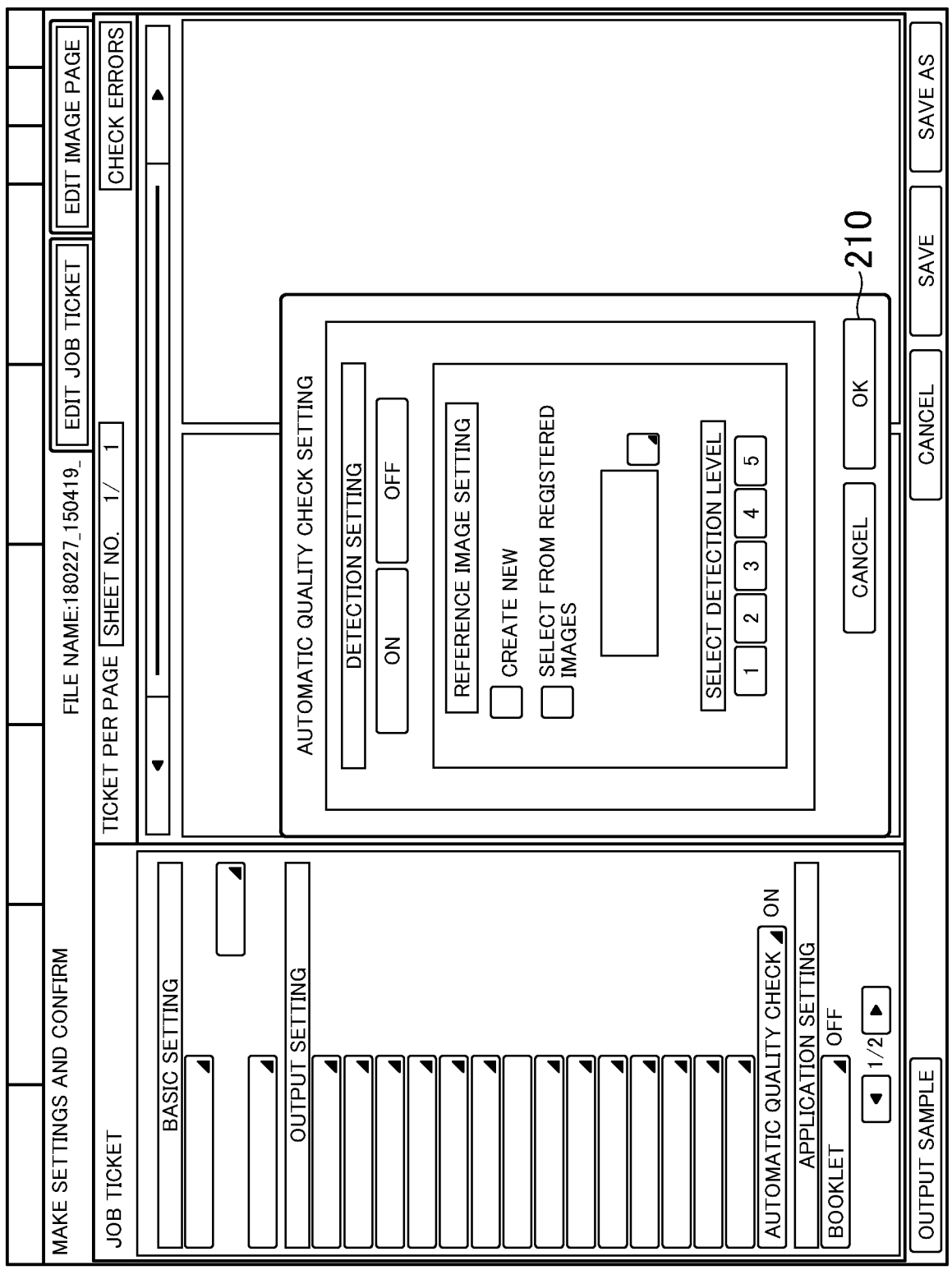
FIG. 5 is a diagram showing an example screen for selecting a reference image setting method.

FIG. 5 is one example of the screen for selecting a reference image setting method, which is displayed on display section 26 and, as shown in the drawing, allows the user to select "newly create (a reference image)" or "select (a reference image) from (existing) registered images".

When the user selects "newly create" on this screen and then selects OK button 210, quality inspection apparatus 50 determines to newly create a reference image (YES in Step S110), and proceeds to Step S120. In contrast, when the user selects "select from registered images" on this screen and then selects OK button 210, quality inspection apparatus 50 determines not to newly create a reference image but use an existing reference image (NO in Step S110), and proceeds to Step S170.

In Step S120, quality inspection apparatus 50 transmits an instruction to image forming apparatus 20 to execute the aforementioned proof printing. Quality inspection apparatus 50 then transmits an instruction to image reading apparatus 30 to read the image on sheet S printed through image forming apparatus 20 (Step S130). Subsequently, quality inspection apparatus 50 temporarily saves an image (read image data) for one copy generated by image reading apparatus 30 to a RAM or the like as a candidate for a reference image (Step S140).

Quality inspection apparatus 50 transmits an instruction to image forming apparatus 20 to display a reference image registration screen (not shown in the drawings) on display section 26, and lets the user visually check if there is a problem with the actual printed material produced by proof printing, and encourages the user to input the check result on the reference image registration screen (Step S150). Subsequently, quality inspection apparatus 50 determines whether to use the image on the printed material produced by proof printing, from the input result on the reference image registration screen (Step S160).

To be specific, when the OK button on the reference image registration screen is selected, quality inspection apparatus 50 uses the image as a reference image (YES in Step S160), stores temporarily saved data as the data of a formal reference image in data storage section 51 so that the reference image is confirmed (Step S190).

In contrast, when the NG button on the reference image registration screen is selected, quality inspection apparatus 50 determines not to use the image as a reference image (NO in Step S160). In this case, quality inspection apparatus 50 repeats the aforementioned processing of Steps S120 to S160 until the user selects the OK button on the reference image registration screen.

In Step S170, for use of an existing reference image, quality inspection apparatus 50 transmits an instruction to image forming apparatus 20 to display a reference image selection screen on which a list of reference images saved to data storage section 51 is shown and the user makes selection from it, on display section 26.

FIG. 6 is a diagram showing an example of a reference image selection screen on display section 26. In this example, the reference image selection screen shows a list of reference image IDs and names (reference image names), registration date and time, sheet sizes, number of pages, and the like saved to various storage media (for example, data storage section 51 and the aforementioned server). Selecting one of those listed on the reference image selection screen and then selecting OK button 220 through an operation of a user confirms a reference image to be used.

To be specific, when OK button 220 on the reference image selection screen is selected, quality inspection apparatus 50 reads the image data of the selected reference image from the corresponding storage medium (Step S180), stores the read data as the data of a formal reference image in data storage section 51 so that the reference image is confirmed (Step S190).

By the way, with a conventional image quality inspection system, depending on the type of sheet S, during execution of a print job by image forming apparatus 20, misdirection may occur in the edge portion of sheet S and this misdirection may cause false detection accompanied with, for example, the message "image defect has occurred" during execution of a quality check job. Since formation of an image in the edge portion of sheet S using image forming apparatus 20 is generally unstable, even if an image is printed near the edge portion of sheet S, false detection accompanied with, for example, the message "image defect has occurred" may occur during execution of a quality check job.

To solve this problem, in image quality inspection system 1 of this embodiment, the edge portion of sheet S is supposed to be an image inspection excluded area during execution of a quality check job. In this embodiment, the CPU (hardware processor) of quality inspection apparatus 50 sets the edge portion of sheet S as an image inspection excluded area. The related configuration will be described in detail below.

FIG. 7 shows an example top screen displayed on display section 26 before execution of a quality check job in image quality inspection system 1 of this embodiment. When "reference image management" button 230 on this top screen is selected by an operation of a user, quality inspection apparatus 50 transmits an instruction to image forming apparatus 20 to display a reference image management screen on operation display section 25 (display section 26). FIG. 8 shows an example of a reference image management screen on display section 26.

Figure 9:
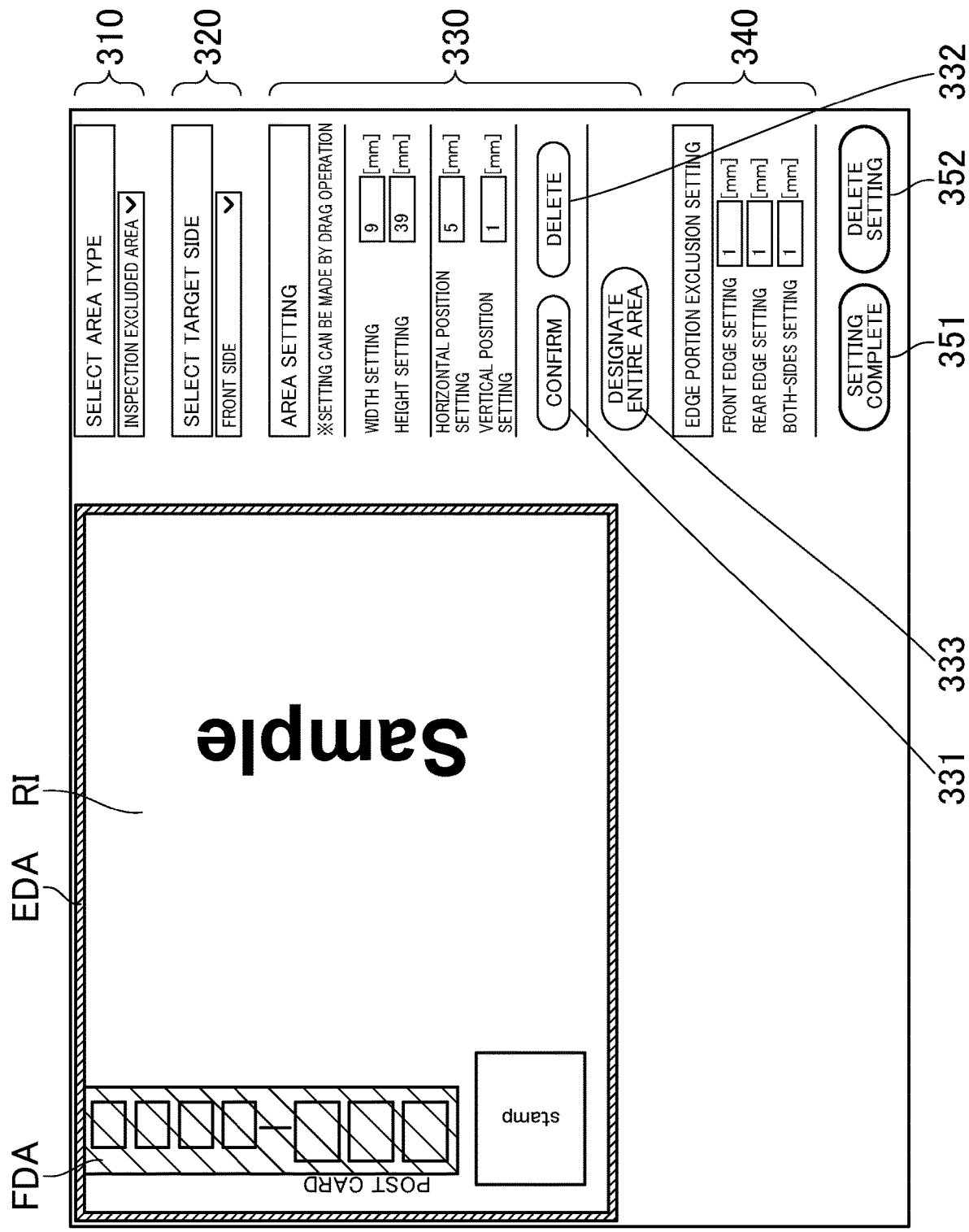
FIG. 9 is a diagram showing an example of an excluded area setting screen serving as a user setting section for setting an area to be excluded from targets of image inspection.

As shown in FIG. 8, the reference image management screen shows a list of reference image IDs and names (reference image names), registration date and time, sheet sizes, number of pages, and the like saved to the aforementioned various storage media as on the reference image selection screen described in relation to FIG. 6. When area setting button 240 is selected by an operation of a user after one of those listed on the reference image management screen is selected, quality inspection apparatus 50 transmits an instruction to image forming apparatus 20 to display an excluded area setting screen, which is used to set an area to be excluded from image inspection targets, on display section 26. FIG. 9 shows an example of an excluded area setting screen on display section 26. In the example shown in FIG. 9, reference image JOB G (an image printed on a postcard) with the ID 00007 is selected from the list of reference images shown in FIG. 8.

As shown in FIG. 9, the excluded area setting screen shows reference image RI selected by the user and "area type selection", "target side selection", "area setting", "edge portion exclusion setting" and other various contents related to that selected reference image RI in such a manner that they can be set by an operation of a user. In this embodiment, the excluded area setting screen displayed on display section 26 and quality inspection apparatus 50 correspond to "user setting section" for setting the image inspection excluded area. In other words, the CPU of quality inspection apparatus 50 serves as "another hardware processor" for setting the image inspection excluded area through user's input operation.

As shown in FIG. 9, area type selection section 310, target side selection section 320, area setting section 330, edge portion exclusion setting section 340, setting complete button 351, and setting delete button 352 are displayed on the right side of the display area of reference image RI on the excluded area setting screen.

Among these, area type selection section 310 selects whether the area set by area setting section 330, which will be described later, is to be an "inspection excluded area" or "inspection target area" by a pull-down menu scheme. In the example shown in FIG. 9, "inspection excluded area" is selected. For simplicity, the description below will be given assuming that area type selection section 310 has selected "inspection excluded area".

Target side selection section 320 is a user interface for selecting whether the area set by area setting section 330 is to be "front side", "back side", or "designated page" of the selected reference image RI. Here, the "front side" and the "back side" are used taking into consideration the case of performing double-sided printing and image inspection on both sides of sheet S, and the sheet front side or sheet back side is set as the side to which the image inspection excluded area other than the sheet edge portion is applied. Among these, "front side" corresponds to odd-numbered pages (that is, pages 1, 3, 5, . . . ) of the pages constituting reference image RI, and "back side" corresponds to even-numbered pages (pages 2, 4, 6, . . . ) of the pages constituting reference image RI.

In target side selection section 320, the above selection can be made by a pull-down menu scheme. In the example shown in FIG. 9, "front side" is selected. When "back side" or "designated page" is selected in target side selection section 320, the display area of reference image RI shows a reference image (RI) corresponding to the selected back side or designated page. An example case where "designated page" is selected in target side selection section 320 will be described later with reference to FIG. 10.

Area setting section 330 is a user interface that mainly sets the area other than the edge portion of the sheet as an exclusion area for image inspection, sets a rectangular frame in displayed reference image RI, and sets an area of the rectangular frame (area FDA in the example of FIG. 9) as an exclusion area for image inspection in a quality check job. In this embodiment, target side selection section 320 and area setting section 330 correspond to a "second setting section" that sets an image inspection excluded area other than the sheet edge portion by input of an area smaller than the size of sheet S.

To be specific, as shown in FIG. 9, in area setting section 330, the size of a rectangular frame to be set, that is, the numerical values of "width" and "height" and "horizontal position" and "vertical position" of the rectangular frame of reference image RI can be designated by an input operation of a user. Moreover, in the area setting section 330, the size and position of the rectangular frame, which is a target for setting, can be set by mouse dragging operation, and the aforementioned numerical values are automatically changed according to the drag operation.

Furthermore, in area setting section 330, in consideration of the case where accurate drag operation for setting related to the rectangular frame is difficult, selectable "designate all area" button 333 is displayed. In this example, when "designate all area" button 333 is selected, the all area of reference image RI is displayed in the form of a rectangular frame. Moving the rectangular frame by a drag operation or the cursor in this state facilitates setting an image inspection excluded area of the size desired by the user to a desired position.

Thus, the image inspection excluded area in area setting section 330 can be set using, in addition to input of numerical values, an intuitive operation with a mouse, and even the selection of designate all area button 333 can be made together. Accordingly, in this embodiment, operability with higher usability can be achieved for setting of the image inspection excluded area.

In the example shown in FIG. 9, the portion of the postal code frame on the front side of the postcard displayed as reference image RI is set as front-side image inspection excluded area FDA, and the width, height, horizontal position, and vertical position of such area FDA are 9 mm, 39 mm, 5 mm, and 1 mm, respectively. Selecting "confirm" button 331 in area setting section 330 in this state confirms the set front-side image inspection excluded area FDA and allows another front-side image inspection excluded area to be additionally settable. Meanwhile, selecting "delete" button 332 in area setting section 330 cancels the setting of front-side image inspection excluded area FDA, hides front-side image inspection excluded area FDA, and initializes each displayed numerical value such as "width setting".

Edge portion exclusion setting section 340 is a user interface for setting the edge portion of sheet S in all pages of the selected reference image RI as an image inspection excluded area in a quality check job. In the example shown in FIG. 9, in this edge portion exclusion setting section 340, numerical values for the front edge, the rear edge, and both sides of sheet S can be designated by an input operation of a user. Here, 1 mm is displayed as the default values of these numerical values. For this reason, in the state shown in FIG. 9, by changing the numerical values in the respective input fields of "front edge setting", "rear edge setting", and "both-side setting" of edge portion exclusion setting section 340 by an input operation of a user, the image inspection excluded area in the sheet edge portion during a quality check job can be set in more detail.

In this example, the "front edge" and "rear edge" of sheet S refer to the front edge (side) and rear edge (side) with respect to a conveying direction based on the sheet conveying direction in image forming apparatus 20 (see FIG. 1). In the example shown in FIG. 9, the upper side adjacent to the postal code frame of the postcard corresponds to the front edge. "Both sides" of sheet S means both edges orthogonal to the above-described sheet conveying direction.

Figure 10:
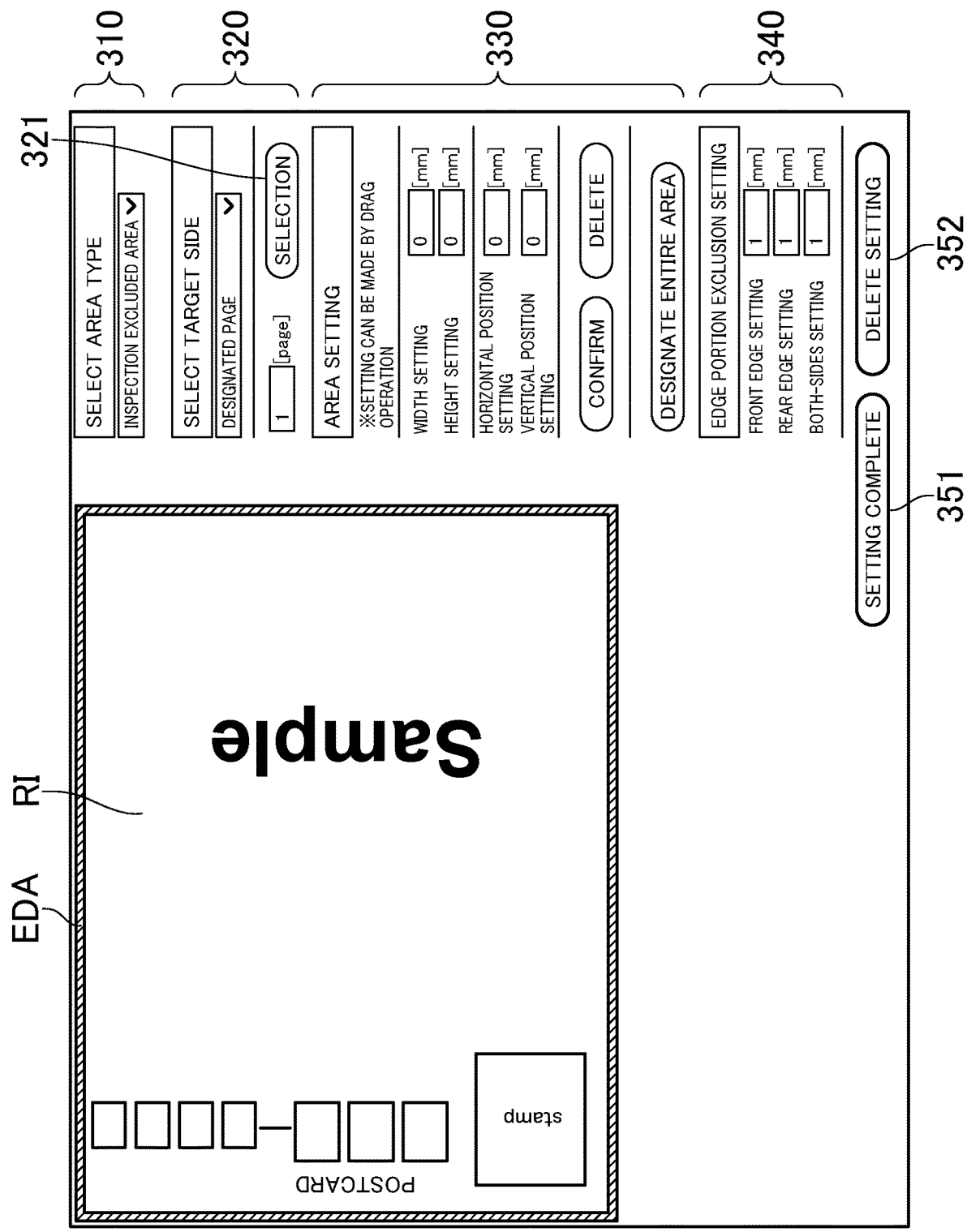
FIG. 10 is a diagram showing an example of display of the excluded area setting screen in the case of setting pages to which an image inspection excluded area other than the sheet edge portion is applied.

FIG. 10 shows an example case where "designated page" is selected as a target side in target side selection section 320. As can be seen by comparison between FIG. 9 and FIG. 10, when "designated page" is selected by pull-down operation in target side selection section 320, the display mode of target side selection section 320 is switched so that a field in which the user inputs the designated page of a target side and "selection" button 321 are added. The example shown in FIG. 10 shows a state after the first page of reference image RI is input as a designated page and selection button 321 is selected (for example, clicked). Afterwards, the image inspection excluded area of the first page can be set arbitrarily by operating above-described area setting section 330.

In this embodiment, the details of the image inspection excluded area in the edge portion of all pages of reference image RI, and an image inspection excluded area on the front side (odd pages), the back side (even pages), or the designated page of reference image RI can be set arbitrarily through the aforementioned input operation. After setting all the image inspection excluded areas on each page constituting reference image RI through this input operation, selecting setting complete button 351 confirms all the settings related to the image inspection excluded areas and stores the related setting data in the memory or the like of quality inspection apparatus 50. Meanwhile, selecting setting delete button 352 resets all the settings related to the image inspection excluded areas.

FIG. 11 (FIGS. 11A to 11D) shows a specific example of the case of setting an image inspection excluded area through the aforementioned user interface.

In the example shown in FIG. 11, in target side selection section 320, "front side" is selected to set front-side image inspection excluded area FDA as shown in FIG. 11A, "back side" is selected to set two back-side image inspection excluded areas BDA as shown in FIG. 11B (see BDA-1 and BDA-2), and "designated page" is then selected to set (tailored) designated page image inspection excluded area IPDA for only the first page as shown in FIG. 11C. As described above, when setting multiple image inspection excluded areas, additional setting for the image inspection excluded areas can be performed by selecting confirm button 331 of area setting section 330 each time. In the example shown in FIG. 11, it is assumed that edge image inspection excluded area EDA is also set to a value slightly larger than the default value (1 mm each) (see FIG. 11D).

FIG. 12 (FIGS. 12A and 12B) shows a portion treated as an image inspection excluded area during image inspection by quality inspection apparatus 50 (during execution of a quality check job) in the setting example shown in FIG. 11 (FIGS. 11A to 11D).

As can be seen by comparison between these drawings, edge image inspection excluded area EDA and its set value (see FIG. 11D) are reflected in the images on all pages (both the front side and back side in the case of double-sided printing) during image inspection (see FIGS. 12A and 12B). Front-side image inspection excluded area FDA and its set value (see FIG. 11A) are reflected in the image of the odd pages during image inspection (see the first page of FIG. 12A and the third page of FIG. 12B). Similarly, back-side image inspection excluded areas BDA (BDA-1 and BDA-2) and their set values (see FIG. 11B) are reflected in the image of the even pages during image inspection (see the second page of FIG. 12A and the fourth page of FIG. 12B). Further, designated page image inspection excluded area IPDA and its set value (see FIG. 11C) are reflected in the image of the designated page (the first page in this example) during image inspection (see the first page of FIG. 12A).

As described above, in this embodiment, edge image inspection excluded area EDA of the sheet edge portion mainly caused by sheet S is reflected on all pages, and the other image inspection excluded areas can be reflected on the selected printing surface or page according to the individual circumstances. Accordingly, in this embodiment, an image inspection excluded area can be reflected during image inspection in a more appropriate mode.

Note that, as described above, postprocessing apparatus 40 of image quality inspection system 1 may include various additional functions such as a cutter, a stapler, and a sheet folding mechanism. When such an additional function is provided in postprocessing apparatus 40, the setting of cutting of sheet S with, for example, a cutter is performed together in some cases before execution of a print job and a quality check job. In these cases, the final size and shape (and the number of pages, for example) of sheet S may change. In this embodiment, even if the final size or the like of sheet S changes in this manner, the image inspection excluded areas (EDA, FDA, BDA, and IPDA) set as described above are excluded from targets for image inspection. Alternatively, as in the example described above, a configuration may be used in which when the setting of cutting of sheet S or the like is not performed, the setting of image inspection excluded areas is performed, whereas when the setting of cutting of sheet S or the like is performed, the setting screen of FIG. 8 or the like is not displayed and the setting of image inspection excluded areas is not performed.

Figure 13:
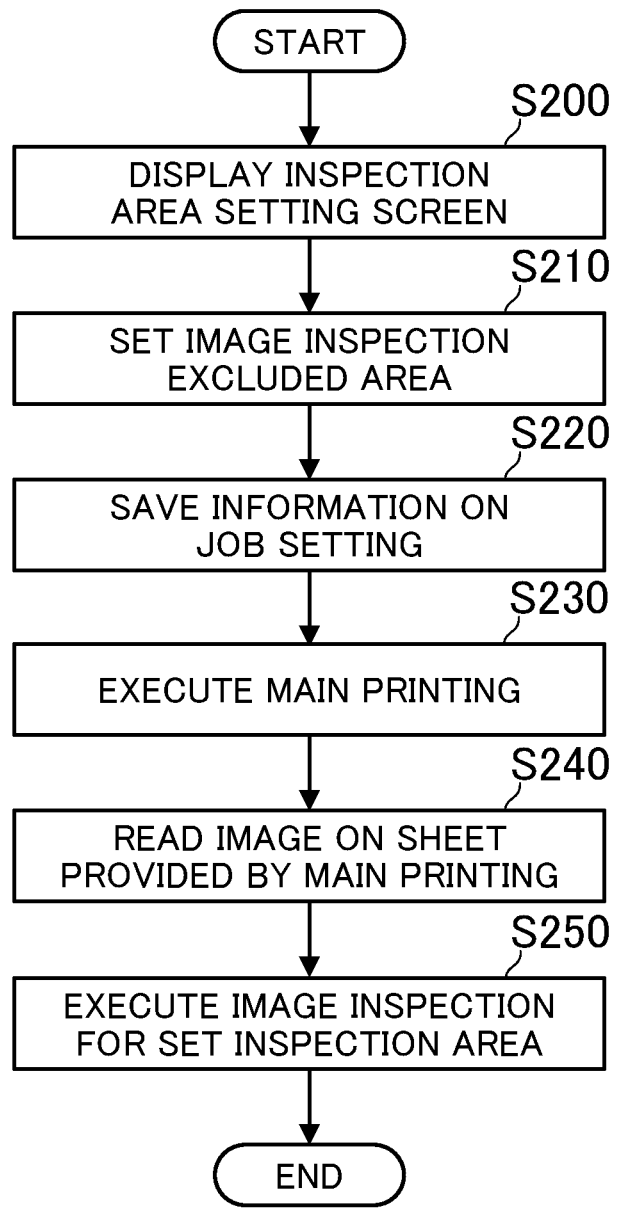
FIG. 13 is a flowchart showing the flow of processing from setting of image inspection area to execution of image inspection.

The flow of processing, which is executed by quality inspection apparatus 50, from the setting of an image inspection area to the execution of image inspection will now be explained with reference to the flowchart of FIG. 13.

In Step S200, quality inspection apparatus 50 transmits an instruction to image forming apparatus 20 to display the inspection area setting screen described with reference to FIGS. 9 and 10 on display section 26.

In Step S210, quality inspection apparatus 50 stores, in the memory, the settings (see FIGS. 9 to 11) of various image inspection excluded areas selected and input by the user through the inspection area setting screen.

Subsequently, in Step S220 after setting complete button 351 described above with reference to FIG. 9 is selected, quality inspection apparatus 50 lets setting information (see FIGS. 11 and 12) on all the image inspection excluded areas confirmed, and saves information on the image inspection excluded areas related to the quality check job in data storage section 51 or the like. At this time, quality inspection apparatus 50 transmits, for example, an instruction to image forming apparatus 20 to display, for example, the message "pressing the start key starts the main printing and quality check job" on display section 26.

Thus, when the start key (not shown in the drawings) of operation section 27 is pressed, the execution of the main printing is started by image forming apparatus 20 (Step S230). Subsequently, the image on sheet S provided by main printing is read by image reading apparatus 30 (Step S240), and read image data generated by the reading is transmitted to quality inspection apparatus 50.

Afterwards, in Step S250, quality inspection apparatus 50 that has received the read image data applies image inspection to the print image other than the image inspection excluded areas (EDA, FDA, BDA, and IPDA) of each page, according to the settings saved in Step S220 (see FIGS. 11 and 12).

As described above, according to this embodiment in which the edge portion of sheet S is excluded as edge image inspection excluded area EDA from targets for image inspection, the occurrence of false detection in image inspection due to misdirection or the like in the edge portion of sheet S can be suppressed. In addition, according to this embodiment, the position or size of edge image inspection excluded area EDA can be arbitrarily adjusted in accordance with the type of sheet S (likelihood of misdirection) and depending on a tendency of the machine, thereby further suppressing the occurrence of false detection in image inspection.

Moreover, according to image quality inspection system 1, an image inspection excluded area can be arbitrarily set out of the edge portion of sheet S, so that, for example, an image including fine images such as dots, an area on sheet S which is partially uneven and likely to be judged as an image defect, and the like can be excluded from the image inspection target in advance. For this reason, according to this embodiment with settings that exclude portions for which it is obvious in advance that accurate inspection is impossible, from targets for image inspection, an image portion for which high quality is required, such as a face photo portion, can be inspected intensively, for example.

Modifications of the aforementioned embodiment will be described below.

The aforementioned embodiment has described an example case where edge portion exclusion setting section 340 (first setting section) capable of adjusting the position and size of edge image inspection excluded area EDA of sheet S is displayed as a user interface (user setting section) and edge image inspection excluded area EDA can be set or changed for each reference image. Alternatively, aforementioned edge portion exclusion setting section 340 may not be displayed, and in Step S210, quality inspection apparatus 50 may consistently determine edge image inspection excluded area EDA. In this case, quality inspection apparatus 50 determines edge image inspection excluded area EDA by the following method.

In general, the performance of formation of an image on the edge portion of sheet S, that is, the distance from the edge of the sheet that is not guaranteed for formation of the image differs depending on the type (model) of the image forming apparatus. In one specific example, image forming apparatus A does not guarantee formation of an image within 2 mm from the front edge of the sheet, 2 mm from the rear edge, 6 mm from both sides, and image forming apparatus B of another type does not guarantee formation of an image within 4 mm from the front edge of the sheet, 6 mm from the rear edge, and 2 mm from both sides. Such edge areas out of the guarantee, which are prone to the aforementioned false detection during image inspection, are preferably set as edge image inspection excluded areas EDA consistently.

In another example of processing, considering differences among models described above, quality inspection apparatus 50 acquires information on the model of image forming apparatus 20, and the area of the sheet edge portion predetermined according to the acquisition result is set as edge image inspection excluded area EDA in Step S210.

Alternatively, when the interface (first setting section) of edge portion exclusion setting section 340 described above with reference to FIG. 9 is displayed, the aforementioned values according to the model are displayed as the default values in the respective numerical value input fields of edge portion exclusion setting section 340. To be specific, quality inspection apparatus 50 acquires information on the model of image forming apparatus 20, and transmits an instruction to image forming apparatus 20 to display the default values of the distance from the edges of sheet S according to the acquisition result in the respective numerical value input fields of "front edge setting", "rear edge setting", and "both-side setting" of edge portion exclusion setting section 340 that has been described with reference to FIG. 9 (Step S200).

In general, the distance from each edge of the sheet that is not guaranteed for formation of an image also varies depending on the type of sheet S (sheet type) to be used. In one specific example, with sheet type X, misdirection occurs within 3 mm from the front edge of the sheet, 3 mm from the rear edge, and 4 mm from both sides, whereas with another type, that is, sheet type Y, misdirection occurs within 5 mm from the front edge of the sheet, 5 mm from the rear edge, and 5 mm from both sides. Such edge areas where such misdirection occurs are prone to the aforementioned false detection and are therefore preferably set as edge image inspection excluded areas EDA consistently.

Considering differences among sheet types described above, quality inspection apparatus 50 acquires information on the sheet type of sheet S to be used, and the areas in the sheet edge portion predetermined according to the acquisition result are set as edge image inspection excluded areas EDA in Step S210. Considering differences among models described above, quality inspection apparatus 50 acquires both information on the model of image forming apparatus 20 and information on the sheet type of sheet S to be used, and the areas in the sheet edge portion based on the acquisition result are set as edge image inspection excluded areas EDA in Step S210. In other words, upon acquisition of the model of image forming apparatus 20 and the sheet type of sheet S to be used, quality inspection apparatus 50 selects a larger value between the distances from the front edge, rear edge, and both sides of the sheet (no-guarantee areas) for the corresponding model, and the distances from the front edge, rear edge, and both sides of the sheet for the corresponding sheet type (misdirection occurrence area) and sets it as edge image inspection excluded area EDA.

FIG. 14 is a table showing an example case where quality inspection apparatus 50 sets edge image inspection excluded areas EDA in the sheet edge areas according to the model of image forming apparatus 20 and the sheet type of sheet S to be used.

As shown in the table of FIG. 14, when the model of image forming apparatus 20 is apparatus A and sheet S is of sheet type X, among the distances from the edges of the sheet, for the front edge and rear edge of the sheet, the misdirection occurrence area (3 mm each) comes with larger values, and for the both sides of the sheet, the image formation no-guarantee area (6 mm) comes with a larger value. Similarly, when the model of image forming apparatus 20 is apparatus A and sheet S is of sheet type Y, among the distances from the edges of the sheet, for the front edge and rear edge of the sheet, the misdirection occurrence area (5 mm each) comes with larger values, and for the both sides of the sheet, the image formation no-guarantee area (6 mm) comes with a larger value. For this reason, those with larger values of these are set as image inspection excluded areas in sheet edge portions.

In contrast, when the model of image forming apparatus 20 is apparatus B and sheet S is of sheet type X, among the distances from the edges of the sheet, for the front edge and rear edge of the sheet, the image formation no-guarantee area (4 mm and 6 mm) comes with larger values, and for the both sides of the sheet, the misdirection occurrence area (4 mm) comes with a larger value. When the model of image forming apparatus 20 is apparatus B and sheet S is of sheet type Y, among the distances from the edges of the sheet, for the front edge and both sides of the sheet, the misdirection occurrence area (5 mm each) comes with larger values, and for the rear edge of the sheet, the image formation no-guarantee area (6 mm) comes with a larger value. For this reason, those with larger values of these are set as image inspection excluded areas in sheet edge portions.

The table shown in FIG. 14 has a form in which more models, sheet types, and distances from the corresponding sheet edge (the front edge, rear edge, and both sides of the sheet) are registered, and can be used as an edge image inspection excluded area (EDA) setting table.

Alternatively, even when the screen of the first setting section described above with reference to FIG. 9 is displayed as a user setting section, a similar value may be displayed as the default value for the "edge portion exclusion setting" column of the first setting section. To be specific, quality inspection apparatus 50 acquires information on the sheet type of sheet S to be used, and transmits an instruction to image forming apparatus 20 to display the default values of the distance from the edge of sheet S according to the acquisition result in the "edge portion exclusion setting" column of the first setting section that has been described with reference to FIG. 9 (Step S200). Alternatively, quality inspection apparatus 50 acquires both information on the model of image forming apparatus 20 and information on the sheet type of sheet S to be used, and transmits an instruction to image forming apparatus 20 to display the area of the sheet edge portion based on the acquisition result (see FIG. 14) as the default values of the "edge portion exclusion setting" column of the first setting section that has been described with reference to FIG. 9 (Step S200).

In still another example, the aforementioned image inspection excluded area setting table (set values as the image inspection excluded area of the sheet edge portion according to the model or sheet type) may be saved to a server on a network, for example. In this case, quality inspection apparatus 50 transmits information on the model of image forming apparatus 20 and the sheet type of sheet S to be used to a server before execution of a quality check job, acquires each value related to the image inspection excluded area in the corresponding sheet edge portion from the server, and sets the acquired values as an image inspection excluded area (Step S210).

Moreover, when the aforementioned false detection occurs when a quality check job is executed with the set values of the image inspection excluded area, quality inspection apparatus 50 may transmit an instruction to the server to increase the corresponding values set in the aforementioned image inspection excluded area setting table, and give feedback on the set values.

To be specific, quality inspection apparatus 50 transmits an instruction to image forming apparatus 20 to display, on display section 26, a notification screen including a button (false detection notification button) used to notify that "false detection has occurred" after execution of the quality check job. The user selects the false detection notification button when false detection frequently occurs in the quality check job. When the false detection notification button is selected, quality inspection apparatus 50 transmits, to the server, information on the model of image forming apparatus 20, the sheet type of sheet S, and the location of the sheet edge where the false detection has occurred (the front edge, rear edge, or both sides) and an instruction to increase the corresponding values set in the image inspection excluded area setting table. Upon reception of the instruction, the server updates the image inspection excluded area setting table so as to increase the corresponding set values to a level at which false detection does not occur, and transmits the updated values to quality inspection apparatus 50 upon execution of the next quality check job.

Here, assuming that the image inspection excluded area setting table held by the server is in the form shown in FIG. 14, the server updates the inspection excluded area setting table in the following manner based on a notification (instruction) from quality inspection apparatus 50.

When the model of image forming apparatus 20 is apparatus A, sheet S is sheet type X, and the position where false detection has occurred is 4 mm from the front edge of sheet S, the server updates the corresponding value in the image inspection excluded area setting table (3 mm in the overlapping among "image forming apparatus A", "sheet type X", and "front edge") to increase it to 5 mm, for example. When the model of image forming apparatus 20 is apparatus B, sheet S is sheet type Y, and the position where false detection has occurred is 6 mm from the both sides of sheet S, the server updates the corresponding value in the image inspection excluded area setting table (5 mm in the overlapping among "image forming apparatus B", "sheet type Y", and "both sides") to increase it to 6 mm, for example. Updating the inspection excluded area setting table in this manner suppresses the occurrence of false detection accompanied with, for example, the message "image defect has occurred" in the edge area of the sheet S in the next quality check job. Accordingly, with the aforementioned configuration, the distance from an edge portion of sheet S to be considered an image inspection excluded area can be optimized.

As described above in detail, according to the aforementioned embodiment, the occurrence of false detection in image inspection due to misdirection or the like in the edge portion of the sheet can be prevented or effectively suppressed.

In the aforementioned embodiment, the main component for the processing of setting an edge portion of sheet S as an image inspection excluded area ("hardware processor" of the present invention) and the main component for the processing of setting the image inspection excluded area through an input operation of a user ("another hardware processor" of the present invention) are the same hardware processor (the CPU of quality inspection apparatus 50). Alternatively, the aforementioned "another hardware processor" may be separated from the hardware processor that sets an edge portion of sheet S as an image inspection excluded area. Further, the aforementioned "another hardware processor" may be a processor which is provided in another apparatus capable of communicating with quality inspection apparatus 50.

Although embodiments of the present invention have been described and illustrated in detail, the disclosed embodiments are made for purpose of illustration and example only and not limitation. The scope of the present invention should be interpreted by terms of the appended claims.

What is claimed is:

1. An image inspection system, comprising:
   an image inspector that conducts an inspection of an image formed on a sheet, wherein the image inspector includes a hardware processor that sets an edge portion of the sheet as an image inspection excluded area that is excluded from targets for the inspection of the image; and
   a sorter that selectively discharges the sheet with the image to one of at least two discharge destinations depending on a result of the inspection.

2. The image inspection system according to claim 1, further comprising another hardware processor that sets the image inspection excluded area through an input operation of a user.

3. The image inspection system according to claim 2, further comprising an operation display that displays a first setter for setting the image inspection excluded area through input of a distance from the edge portion of the sheet.

4. The image inspection system according to claim 3, wherein the first setter displays a default value of a distance from the edge portion of the sheet according to a type of an image former used to form the image.

5. The image inspection system according to claim 3, wherein the first setter displays a default value of a distance from the edge portion of the sheet, according to the sheet type of the sheet.

6. The image inspection system according to claim 3, wherein the image inspector applies the image inspection excluded area set through the first setter to all pages of the sheet related to a print job.

7. The image inspection system according to claim 2, further comprising an operation display that displays a second setter for setting the image inspection excluded area other than the edge portion of the sheet through input of an area having a size smaller than that of the sheet.

8. The image inspection system according to claim 7, wherein
   the second setter displays a page to which the image inspection excluded area other than the edge portion of the sheet is applied, the page being settable, and
   the image inspector applies the image inspection excluded area set through the second setter to the sheet on the applied page in a print job and inspects the image.

9. The image inspection system according to claim 8, wherein
   the second setter displays a side to which the image inspection excluded area other than the sheet edge portion is applied, the side being settable and being a sheet front side or a sheet back side, and
   the image inspector applies the image inspection excluded area set through the second setter to the applied side of all the sheets in a print job and inspects the image.

10. The image inspection system according to claim 7, wherein the second setter is configured to perform the input of the area by at least one of the following operations: input of a numerical value, mouse dragging, and button selection.

11. The image inspection system according to claim 10, wherein when the button selection is made, the second setter displays the entire area of the sheet as the image inspection excluded area.

12. The image inspection system according to claim 1, wherein the hardware processor sets an area in the edge portion of the sheet as the image inspection excluded area, the area being predetermined according to a type of an image former used to form the image.

13. The image inspection system according to claim 12, wherein the image inspection system is capable of communicating with a server that holds a value of a distance from the edge portion of the sheet, the value depending on the type of the image former, and
   when false detection occurs during the inspection of the image for which the image inspection excluded area is set according to the value of the distance from the edge portion of the sheet acquired from the server, the image inspector notifies the server to increase the value of the distance from the edge portion of the sheet.

14. The image inspection system according to claim 1, wherein the hardware processor sets an area in the edge portion of the sheet as the image inspection excluded area, the area being predetermined according to a sheet type of the sheet.

15. The image inspection system according to claim 14, wherein the image inspection system is capable of communicating with a server that holds a value of a distance from the edge portion of the sheet, the value depending on the type of the sheet, and
   when false detection occurs during the inspection of the image for which the image inspection excluded area is set according to the value of the distance from the edge portion of the sheet acquired from the server, the image inspector notifies the server to increase the value of the distance from the edge portion of the sheet.

16. The image inspection system according to claim 1, wherein the hardware processor sets an area in the edge portion of the sheet as the image inspection excluded area, the area being predetermined according to a type of an image former used to form the image or according to a sheet type of the sheet.

17. The image inspection system according to claim 1, wherein a predetermined area at an entire edge portion of the sheet is an image inspection excluded area, whereby the predetermine area cannot be set as an inspection area by the image inspection apparatus.

18. The image inspection system according to claim 1, wherein a predetermined area at an edge portion on a front side, a rear side, or both the front side and the rear side is settable by an input operation of a user.

19. The image inspection system according to claim 1, further comprising an operation display that displays a first setter for setting the image inspection excluded area through input of a distance from the edge portion of the sheet, and a second setter for setting the image inspection excluded area other than the edge portion of the sheet through input of an area having a size smaller than that of the sheet, the first setter and the second setter having different settings.

20. The image inspection system according to claim 1, further comprising an operation display that displays a first setter for setting the image inspection excluded area through input of a distance from the edge portion of the sheet, and a second setter for setting the image inspection excluded area other than the edge portion of the sheet through input of an area having a size smaller than that of the sheet, the first setter being set independently of the second setter.

21. An image inspection method, comprising:
 setting an edge portion of a sheet having an image as an image inspection excluded area that is excluded from targets for inspection of the image,
 conducting an inspection of the image, and
 selectively discharging the sheet to one of at least two discharge destinations according to a result of the inspection.

22. A non-transitory computer-readable recording medium storing an image inspection program that causes a computer to perform:
 setting an edge portion of a sheet having an image as an image inspection excluded area,
 conducting an inspection of the image, and
 selectively discharging the sheet to one of at least two discharge destinations according to a result of the inspection.

23. An image inspection system, comprising:
 an image inspector that conducts an inspection of an image formed on a sheet, wherein the image inspector includes a hardware processor that sets an edge portion of the sheet as an image inspection excluded area that is excluded from targets for the inspection of the image,
 the image inspection excluded area being set based on:
 a default or automatic setting; or
 an input operation of a user using an operation display that displays a first setter for setting the image inspection excluded area through input of a distance from the edge portion of the sheet.

* * * * *